No. 832,302. PATENTED OCT. 2, 1906.
C. A. ERNST.
METHOD OF SEALING METAL INTO GLASS OR OTHER VITREOUS MATERIAL.
APPLICATION FILED JUNE 12, 1903.

Witnesses:
George A. Thornton
Helen Orford

Inventor:
Carl A. Ernst,
by Albert G. Davis
Att'y.

UNITED STATES PATENT OFFICE.

CARL A. ERNST, OF SCHENECTADY, NEW YORK, ASSIGNOR TO GENERAL ELECTRIC COMPANY, A CORPORATION OF NEW YORK.

METHOD OF SEALING METAL INTO GLASS OR OTHER VITREOUS MATERIAL.

No. 832,302. Specification of Letters Patent. Patented Oct. 2, 1906.

Application filed June 12, 1903. Serial No. 161,165.

*To all whom it may concern:*

Be it known that I, CARL A. ERNST, a citizen of the United States, residing at Schenectady, in the county of Schenectady and State of New York, have invented certain new and useful Improvements in Methods of Sealing Metal into Glass or other Vitreous Material, of which the following is a specification.

My invention relates to the sealing of metal into glass or other vitreous material, and has for its particular object the production of a non-leaking joint between the metal and the glass.

The invention is therefore particularly useful in connection with leading-in wires for incandescent lamps, mercury-lamps or rectifiers, X-ray tubes, and the like. In case it is desired to seal a leading-in wire into glass I first maintain the wire in a vacuum and heat the wire while in the vacuum, so as to drive off the gases which by the action of heat are set free from the surface of the wire. These gases are withdrawn by the exhaust or air pump as fast as set free. When gas is no longer driven off in appreciable quantity, the wire when in a heated condition and while still in vacuum is coated with the glass and the whole then allowed to cool. By this operation an exceedingly tight joint is formed between the glass and the wire.

The features of novelty which constitute my invention I have pointed out with particularity in the appended claim, while in the accompanying drawings I have represented certain means for carrying my invention into operation.

Figure 1:
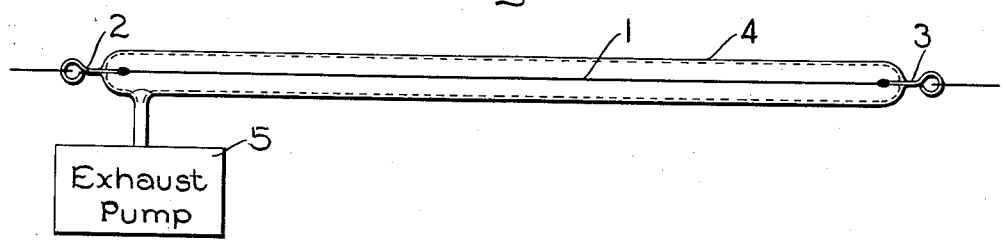
Figure 2:
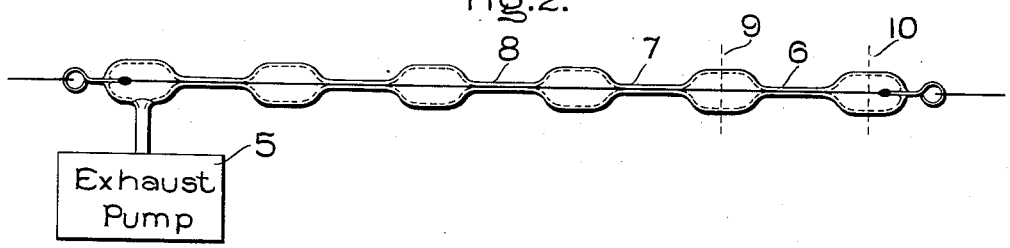
Figure 3:

In the drawings, Figure 1 represents the first stage of coating a wire with glass; Fig. 2, a succeeding stage, and Fig. 3 a portion of the wire thus coated.

My invention is particularly useful in connection with oxidizable metal—such, for example, as nickel-steel or the like—of such composition as to have a suitable coefficient of expansion. In sealing such a wire into glass I first connect its ends to two platinum leading-in wires. In Fig. 1 the nickel-steel wire is indicated at 1 and the platinum leading-in wires at 2 and 3. The leading-in wires are then sealed through the opposite ends of a glass tube 4 of suitable length and diameter. This tube is connected to an exhaust-pump 5, so that the air therein may be exhausted. In some instances I prefer first to fill the tube with hydrogen or some other gas before proceeding with the exhaustion; but this, however, though advantageous, is not essential. After the apparatus has been arranged as shown in Fig. 1 the tube 4 is exhausted, while at the same time current from a suitable source is passed through the wire 1 through the medium of the leading-in conductors 2 and 3. The wire is brought to a white heat, thereby causing gases to be given off, which gases are removed by the exhaust-pump as fast as they are set free. When practically no further gases are given off and while the wire 1 is still hot, the glass tube is heated by a suitable torch at points a short distance apart until the glass flows around the wire. It will be evident that the softening of the glass by the torch allows the external pressure of the atmosphere to contract the softened portions about the wire 1. When this operation is completed, the glass tube 4 has assumed the condition shown in Fig. 2, in which the wire 1 is hermetically sealed into the glass tube at intervals, (indicated, for example, at 6 7 8, &c.) The heating-current passing through the wire 1 is then discontinued and the air-pump turned off. On cooling, the glass tube is broken at suitable intervals—as, for example, along dotted lines indicated at 9 and 10—and the wire cut between the points, which are sealed to the glass. The resulting short sections of wire, such as at 11 in Fig. 3, with the closely adherent glass coating 12, may then be sealed into the glass envelop of any desired apparatus, such as incandescent lamps, mercury-lamps, or other devices of similar character.

By utilizing the sealing-in method above described a wire, such as iron or nickel-steel, does not become covered with oxid, the presence of which would interfere with the tightness of the seal. Moreover, inasmuch as the wire is not cooled before it is covered with glass the wires have no chance to absorb gases anew, which on reheating by the passage of current during normal operation would give off bubbles, thus impairing the joint between the wire and the glass.

What I claim as new, and desire to secure by Letters Patent of the United States, is—

5   As an article of manufacture, a metal wire, from which occluded gases have been removed, and a coating of glass about said wire of substantially uniform thickness, said glass being in intimate contact with the wire and forming a gas-tight joint therewith.

In witness whereof I have hereunto set my hand this 10th day of June, 1903.

CARL A. ERNST.

Witnesses:
BENJAMIN B. HULL,
HELEN ORFORD.